(12) United States Patent
Archard et al.

(10) Patent No.: US 7,649,909 B1
(45) Date of Patent: Jan. 19, 2010

(54) ADAPTIVE TUNNEL TRANSPORT PROTOCOL

(75) Inventors: Paul Leslie Archard, Kelowna (CA); Troy S. Ihmels, Kelowna (CA); Ronald D. Chittaro, Kelowna (CA)

(73) Assignee: Packeteer, Inc., Cupertino, CA (US)

( * ) Notice: Subject to any disclaimer, the term of this patent is extended or adjusted under 35 U.S.C. 154(b) by 610 days.

(21) Appl. No.: 11/479,270

(22) Filed: Jun. 30, 2006

(51) Int. Cl.
*H04J 3/18* (2006.01)

(52) U.S. Cl. .................................... 370/477; 709/247

(58) Field of Classification Search ........................ None
See application file for complete search history.

(56) References Cited

U.S. PATENT DOCUMENTS

| | | | |
|---|---|---|---|
| 4,730,348 A | 3/1988 | MacCrisken | |
| 5,045,852 A | 9/1991 | Mitchell et al. | |
| 5,280,600 A | 1/1994 | Van Maren et al. | |
| 5,389,922 A | 2/1995 | Seroussi et al. | |
| 5,467,087 A | 11/1995 | Chu | |
| 5,521,940 A | 5/1996 | Lane et al. | |
| 5,539,879 A | 7/1996 | Pearce et al. | |
| 5,832,520 A | 11/1998 | Miller | |
| 5,870,036 A | 2/1999 | Franaszek et al. | |
| 5,949,355 A | 9/1999 | Panaoussis | |
| 5,978,805 A | 11/1999 | Carson | |
| 5,990,810 A | 11/1999 | Williams | |
| 6,008,743 A | 12/1999 | Jaquette | |
| 6,307,488 B1 | 10/2001 | Cooper | |
| 6,519,636 B2* | 2/2003 | Engel et al. ................. | 709/223 |
| 6,624,761 B2 | 9/2003 | Fallon | |
| 6,856,651 B2 | 2/2005 | Singh | |
| 6,999,429 B1 | 2/2006 | Hannu et al. | |
| 7,003,714 B1 | 2/2006 | Sundaram et al. | |
| 7,069,342 B1* | 6/2006 | Biederman ................... | 709/247 |
| 7,113,963 B1 | 9/2006 | McCaw | |
| 7,114,027 B2 | 9/2006 | Gilfix et al. | |
| 7,305,486 B2* | 12/2007 | Ghose et al. ................. | 709/232 |
| 7,420,992 B1 | 9/2008 | Fang | |
| 7,443,321 B1 | 10/2008 | Kaufman | |
| 2005/0091234 A1 | 4/2005 | Hsu et al. | |
| 2005/0141419 A1* | 6/2005 | Bergamasco et al. ........ | 370/230 |
| 2007/0291767 A1* | 12/2007 | Smith et al. ............ | 370/395.21 |
| 2009/0019345 A1 | 1/2009 | Kaufman | |

OTHER PUBLICATIONS

Sisalem, D., Schulzrinne, H., The Adaptive Load Service (ALS): An ABR-Like Service for the Internet, GMD FOKUS, Berlin, Germany, *Computers and Communications, 2000, Proceedings, ISCC 2000, Fifth IEEE Symposium*, Jul. 3-6, 2000.
Adler-32, Wikipedia, the free encyclopedia, http://en.wikipedia.org/wiki/Adler32, Feb. 13, 2007.

* cited by examiner

*Primary Examiner*—Steven H Nguyen
*Assistant Examiner*—Alex Skripnikov
(74) *Attorney, Agent, or Firm*—Baker Botts L.L.P.

(57) ABSTRACT

An exemplary embodiment provides a method for use in a data compression device wherein optimal compression is maintained in response to network characteristics by switching between a first compression mode, including use of a stateful compression algorithm and a reliable transport protocol, to a second compression mode, including a second compression algorithm and an unreliable transport protocol, as needed in order to keep data flowing. In the second compression mode, rather than bypassing an established tunnel between two data compression devices altogether and losing the benefits of compression, this method allows data to be compressed using an algorithm that does not require reliable packet delivery. When a positive change in network conditions is detected, data transmission using the first compression mode resumes.

18 Claims, 6 Drawing Sheets

ADAPTIVE TUNNEL TRANSPORT PROTOCOL

CROSS-REFERENCE TO RELATED APPLICATIONS

This application makes reference to the following commonly owned U.S. patent applications and patents, which are herein incorporated in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 10/015,826 now U.S. Pat. No. 7,013,342, in the name of Guy Riddle, entitled "Dynamic Tunnel Probing in a Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, now U.S. Pat. No. 6,456,360, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 09/966,538, in the name of Guy Riddle, entitled "Dynamic Partitioning of Network Resources;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/178,617, in the name of Robert E. Purvy, entitled "Methods, Apparatuses and Systems Facilitating Analysis of Network Device Performance;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled. "Classification Data Structure enabling Multi-Dimensional Network Traffic Classification and Control Schemes;"

U.S. patent application Ser. No. 10/334,467, in the name of Mark Hill, entitled "Methods, Apparatuses and Systems Facilitating Analysis of the Performance of Network Traffic Classification Configurations;"

U.S. patent application Ser. No. 10/453,345, in the name of Scott-Hankins, Michael R. Morford, and Michael J. Quinn, entitled "Flow-Based Packet Capture;"

U.S. patent application Ser. No. 10/611,573, in the name of Roopesh Varier, David Jacobson and Guy Riddle, entitled "Network Traffic Synchronization Mechanism;"

U.S. patent application Ser. No. 10/676,383 in the name of Guy Riddle, entitled "Enhanced Flow Data Records Including Traffic Type Data;"

U.S. patent application Ser. No. 10/720,329, in the name of Weng-Chin Yung, Mark Hill and Anne Cesa Klein, entitled "Heuristic Behavior Pattern Matching of Data Flows in Enhanced Network Traffic Classification;"

U.S. patent application Ser. No. 10/812,198 in the name of Michael Robert Morford and Robert E. Purvy, entitled "Adaptive, Application-Aware Selection of Differentiated Network Services;"

U.S. patent application Ser. No. 10/843,185 in the name of Guy Riddle, Curtis Vance Bradford and Maddie Cheng, entitled "Packet Load Shedding;"

U.S. patent application Ser. No. 10/858,340 in the name of Roopesh R. Varier, James J. Stabile, Paul Leslie Archard, Guy Riddle and David Jacobsen, entitled "Network Traffic Synchronization and Data Compression in Redundant Network Topologies;"

U.S. patent application Ser. No. 10/938,435 in the name of Guy Riddle, entitled "Classification and Management of Network Traffic Based on Attributes Orthogonal to Explicit Packet Attributes;" and U.S. patent application Ser. No. 11/027,744 in the name of Mark Urban, entitled "Adaptive Correlation of Service Level Agreement and Network Application Performance."

FIELD

The present invention relates to computer networks and, more particularly, to data compression in computer networks.

BACKGROUND

Businesses are growing increasingly dependent on distributed computing environments and wide area computer networks to accomplish critical tasks. Indeed, a wide variety of business applications are deployed across intranet, extranet and Internet connections to effect essential communications with workers, business partners and customers. As the number of users, applications and external traffic increases, however, network congestion forms, impairing business application performance. Enterprise network managers, therefore, are constantly challenged with determining the volume, origin and nature of network traffic to align network resources with business priorities and applications.

Data compression, caching and other technologies that optimize or reduce the size of network traffic flows can be deployed to improve the efficiency and performance of a computer network and ease congestion at bottleneck links. For example, implementing data compression and/or caching technology can improve network performance by reducing the amount of bandwidth required to transmit a given block of data between two network devices along a communications path. Data compression technologies can be implemented on routing nodes without alteration of client or server end systems, or software applications executed therein, to reduce bandwidth requirements along particularly congested portions of a communications path. For example, tunnel technologies, like those used in Virtual Private Network (VPN) implementations, establish tunnels through which network traffic is transformed upon entering at a first network device in a communications path and restored to substantially the same state upon leaving a second network device.

A variety of compression algorithms and technologies have been developed, such as the run-length encoding ("RLE"), Huffman encoding, Lempel-ziv compression (e.g., LZ77, LZ78, etc.), Lempel-Ziv-Welch ("LZW") compression, fixed library compression, and combinations/variants of the foregoing compression methods. All compression methods have their own advantages and tradeoffs. It is generally understood that no single compression method is superior for all applications and data types. The most beneficial choice of compression tools and libraries for a particular network application depends on the characteristics of the data and application in question: streaming versus file; expected patterns and regularities in the data; relative importance of CPU usage, memory usage, channel demands and storage requirements; and other factors.

Optimal compression typically is achieved by using algorithms which require delivery of compressed data in the correct order and without corruption. This requires a "reliable" transport protocol. However, under some circumstances, such as high-loss networks, the ability of a reliable transport to deliver packets in a timely manner can be compromised, leading to stalls in data delivery. This can cause problems for some application protocols, particularly those for whom reliability was not desirable or necessary in the first place (e.g. UDP-based protocols). When these aforementioned situations occur, the established tunnel between two network devices will typically be bypassed and data is no longer compressed. As a result, the benefits of compression are no longer available.

In view of the foregoing, it may be beneficial to provide methods, apparatuses and systems that maintains compression of data under adverse network conditions, such as lossy network and other conditions.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with methods, apparatuses and systems which are meant to be exemplary and illustrative, not limiting in scope. In various embodiments, one or more of the above-described problems have been reduced or eliminated, while other embodiments are directed to other enhancements.

An embodiment by way of non-limiting example provides a method for use in a data compression device wherein optimal compression can be maintained in a network with unpredictable performance and/or reliability characteristics by switching between a first compression mode, including use of a stateful compression algorithm and a reliable transport protocol, to a second compression mode, including a second compression algorithm and an unreliable transport protocol, as needed in order to keep data flowing. In the second compression mode, rather than bypassing an established tunnel between two data compression devices altogether and losing the benefits of compression, this method allows data to be compressed using an algorithm that does not require reliable packet delivery. When a positive change in network conditions is detected, data transmission using the first compression mode resumes. Implementations of the invention allow for the application of the best compression possible under current network conditions.

Additionally, to avoid causing re-ordering of outgoing packets when switching between reliable and unreliable modes, a signaling protocol is employed whereby the tunnel module is notified of a pending blockage of the reliable transport prior to it actually occurring. This allows the tunnel to avoid queuing up packets in a transmit queue of the reliable protocol and having those packets overtaken by later packets which are sent using an unreliable protocol. This is advantageous since packets received out of order, at a recipient, results in the recipient believing that data has been lost. That in turn may cause the recipient to send negative acknowledgements ("NACKs") to the sender which adds more traffic to a network, thus further exacerbating unfavorable network conditions.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, apparatuses and methods which are meant to be exemplary and illustrative, not limiting in scope.

Figure 1:
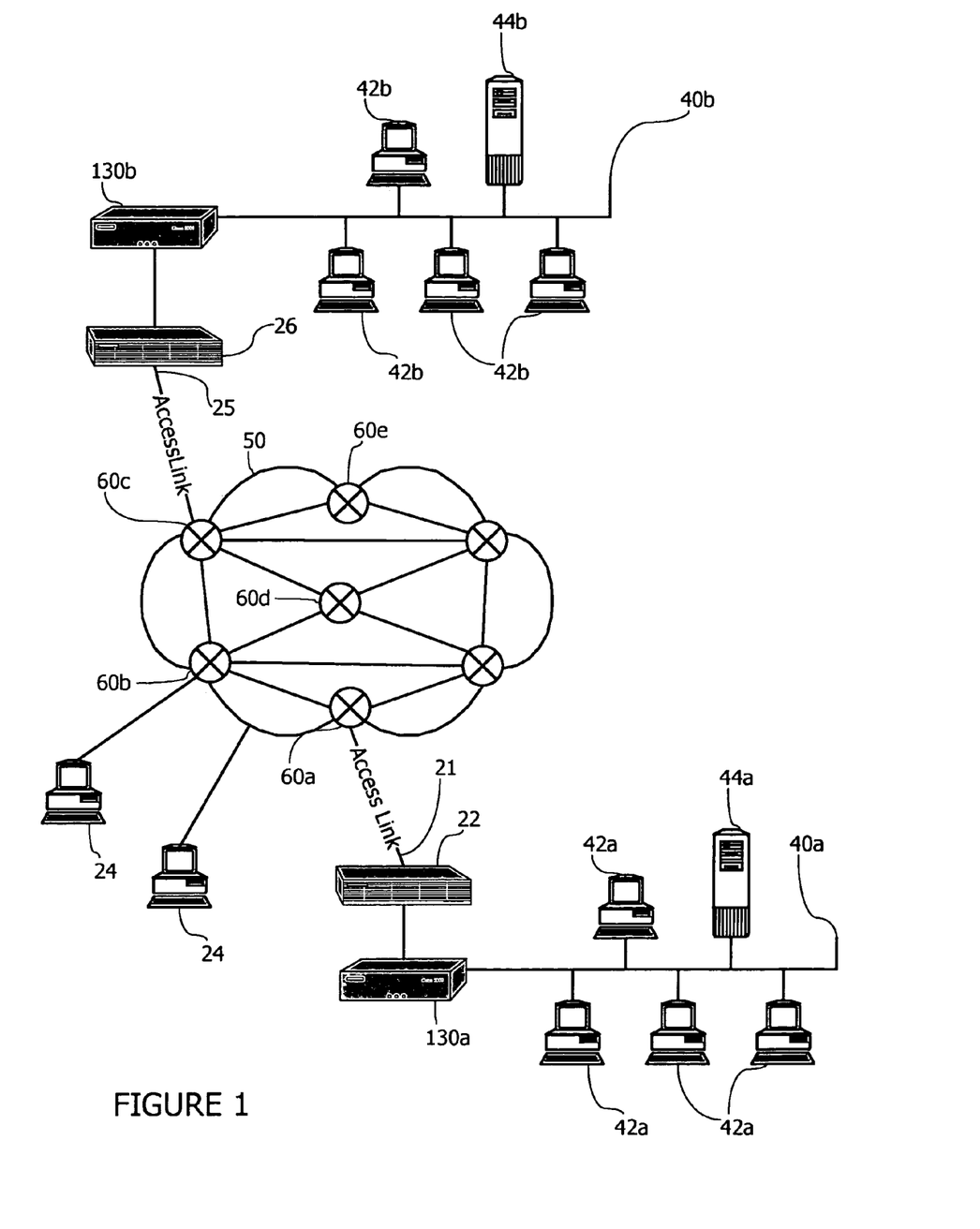
FIG. 1 is a functional block diagram illustrating a computer network system architecture in which the claimed embodiments may operate.

FIG. 1 illustrates a packet-based computer network environment including data compression devices 130a and 130b. As FIG. 1 shows, local area computer networks 40a and 40b interconnect several TCP/IP end systems, respectively. These end systems include client devices (42a, 42b) and server devices (44a, 44b), and provides access to resources operably connected to computer network 50 via routers 22 and 26 and access links 21 and 25. Client devices 24 are additional TCP/IP end systems operably connected to computer network 50 by any suitable means, such as through an Internet Services Provider (ISP). The computer network environment, including computer network 50 is a packet-based communications environment, employing TCP/IP protocols and has a plurality of interconnected digital packet transmission stations or routing nodes 60a-60e. As FIG. 1 shows, data compression device 130a is provided between router 22 and local area computer network 40a, while data compression device 130b is disposed between router 26 and local area computer network 40b. Data compression devices 130a, 130b are operative to establish compression tunnels with routing nodes or other network devices in a computer network environment that include compatible compression tunnel capabilities. Data compression devices 130a, 130b, in one implementation, are further operative to identify routing nodes or other network devices (such as each other) along a communications path to a destination host that include compatible compression tunnel capabilities. In one embodiment, data compression devices 130a, 130b are also operable to compress data flows utilizing stateful/reliable and stateless/unreliable compression algorithms and switching between the two algorithms is dependent on network conditions. When network conditions are favorable, stateful/reliable compression is typically utilized. Due to the switching, an optimal compression mode is maintained in view of those network conditions.

A. Exemplary Network Device Architecture and Operation

Before the claimed embodiments are further detailed, FIGS. 2-3 will first be described in order to convey an environment in which those claimed embodiments may operate.

Figure 2:
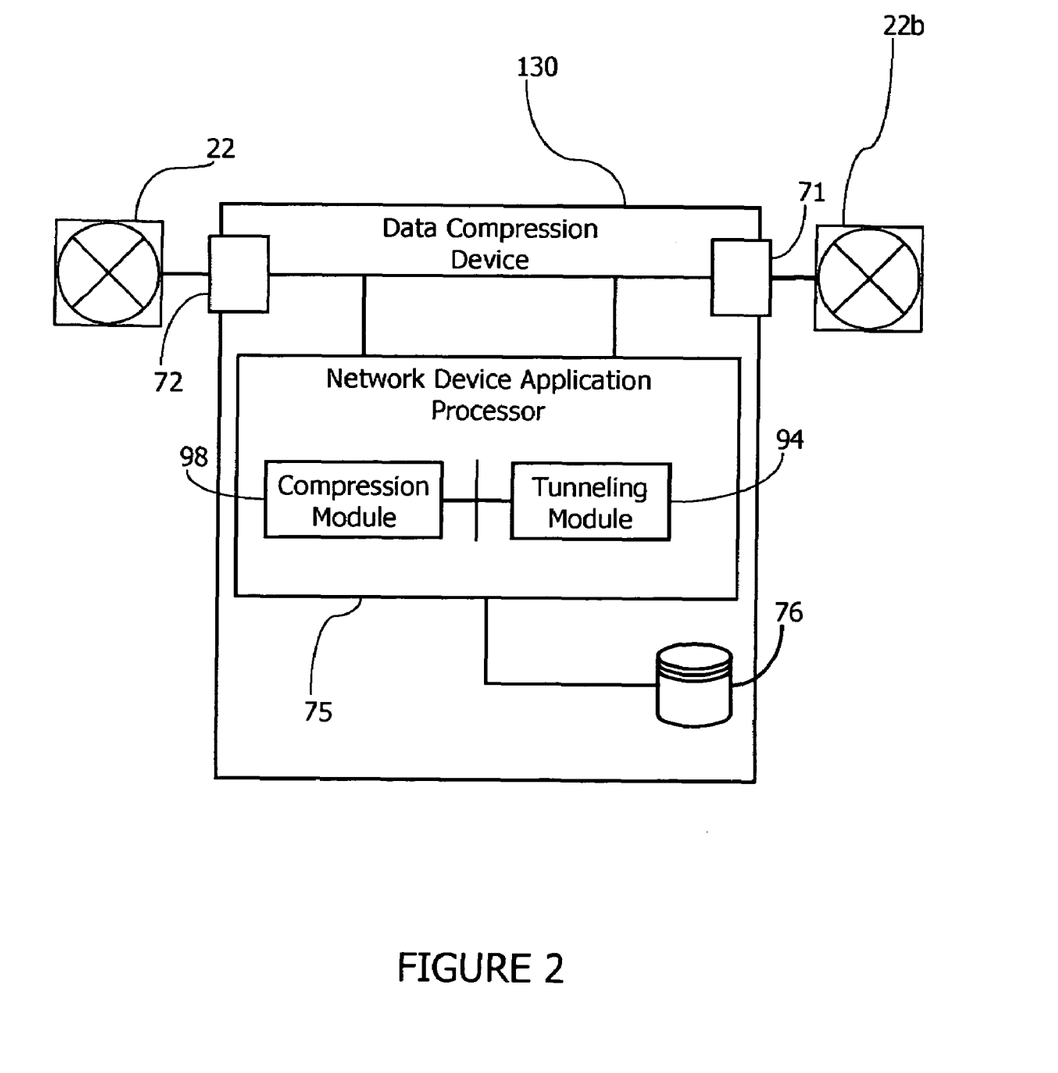
FIG. 2 is a functional block diagram illustrating the functionality of a data compression device, in accordance with an exemplary embodiment.

As FIG. 2 illustrates, data compression device 130, in one implementation, comprises network device application processor 75, and first and second network interfaces 71, 72, which operably connect data compression device 130 to the communications path between routers 22a and 22b. Routers 22a and 22b typically will additionally be connected to a WAN or LAN—neither of which are shown in FIG. 2. Network device application processor 75 generally refers to the functionality implemented by data compression device 130, such as data compression, and the like. In one embodiment, network device application processor 75 is a combination of hardware and software, such as a central processing unit, memory, a system bus, an operating system, device drivers, and one or more software modules implementing the functions performed by data compression device 130. For didactic purposes, data compression device 130 is configured to establish tunnels with remote network devices, and compress/decompress network traffic traversing router 22. The above-identified patents and patent applications, incorporated by reference herein, disclose various functionalities and features that may be incorporated into data compression devices according to various implementations of the claimed embodiments.

In one embodiment, first and second network interfaces 71, 72 are the hardware communications interfaces that receive and transmit packets over the computer network environment. In another implementation, first and second network interfaces 71, 72 reside on separate network interface cards operably connected to the system bus of data compression device 130. In yet another implementation, first and second network interfaces reside on the same network interface card. In addition, the first and second network interfaces 71, 72 can be wired network interfaces, such as Ethernet (IEEE 802.3) interfaces, and/or wireless network interfaces, such as IEEE 802.11, BlueTooth, satellite-based interfaces, and the like. As FIG. 2 illustrates, data compression device 130, in one embodiment, includes persistent memory 76, such as a hard disk drive or other suitable memory device, such writable CD, DVD, or tape drives. In other implementations, data compression device 130 can include additional network interfaces, beyond network interfaces 71 and 72, to support additional access links or other functionality. Furthermore, U.S. application Ser. No. 10/843,185 provides a description of the operation of various modules (according to one possible implementation of the claimed embodiments), such as network interface drivers, and data structures for receiving into memory and processing packets encountered at network interfaces 71, 72.

As FIG. 2 illustrates, network device application processor 75, in one implementation, includes a compression module 98 and a tunneling module 94. Data compression module 98 is operative to compress data, while tunneling module is operative to establish and maintain tunnels with remote network devices along network paths to destination hosts.

A.1. Compression and Tunneling

Tunneling module 94 is operative to establish and maintain tunnels with compatible routing nodes or other network devices in a communications path. Compression module 98 includes data transformation functionality, such as data compression or caching functionality. Tunneling module 94 includes tunneling functionality based on one or more transport and encapsulation protocols. In one embodiment, tunneling module 94 includes a variety of tunnel capabilities, including the ability to employ different transport and encapsulation protocols, while compression module 98 is capable of employing different data compression algorithms.

Tunneling module 94 is also operative to handle the path between data compression device 130 and the tunnel partner corresponding to the path, using encapsulation and transport technologies, such as Generic Routing Encapsulation (GRE) protocol (RFC 2890), IP in IP Tunneling protocol (RFC 1853), and/or any other suitable protocol. Tunneling module 94 also includes tunnel management functionality allowing for maintenance of tunnel state information, as well as recovery functionality that handles loss of tunnels, routing failures and other transmission errors, such as lost or out-of-order packet transmissions (if applicable to the compression protocol).

In one embodiment, tunneling module 94 is operative to probe communication paths for routing nodes or other network devices that include compatible compression and tunneling capabilities. For example, U.S. patent application Ser. No. 10/015,826, incorporated by reference herein, discloses methods for probing a communications path for compatible tunnel partners. Using this technology, data compression device 130*a* of FIG. 1, for example, may transmit probe requests along the communications path to end system 44*b*, which may be intercepted by data compression device 130*b*. As discussed in the above-identified application, data compression device 130*a* processes probe responses to identify an appropriate compression tunnel partner, such as data compression device 130*b*.

Tunneling module 94 is operative to support one or more reliable transport protocols (e.g., TCP), and one or more unreliable transport layer protocols (e.g., UDP). Is also operative to interact with the TCP protocol stack to determine whether to switch between reliable and unreliable compression/tunneling modes, as discussed below.

Compression functionality generally transforms data packets from a first state to a second, smaller state. Compatible de-compression functionality is operative to transform the data from the second smaller state to substantially the first state. For example, according to some algorithms and data formats, de-compression does not recover all of the original data. Transformation functionality may include a variety of types and protocols. For example, compression module 98 may include compression and/or decompression functionality, caching functionality, and encryption and/or decryption functionality, all of a variety of types and configurations. For example, compression module 98 may include a plurality of data compression capabilities, such as compression functionality optimized for different kinds of data (e.g., text files, image files, audio files, etc.) or network application types. Data transformation can be performed on just the packet data, the header data, or on the entire packet depending on the implementation. In one implementation, compression module 98 may apply different compression techniques to the headers and payloads of individual packets. In addition, compression module 98 can operate on packets individually, or collect packets and transform them on an aggregate basis. In addition, compression module 98 may operate to transform data from one compression format to another compression format, such as converting image data files from one format to another.

Compression module 98, in one implementation, comprises a plurality of compression algorithm sub-modules each corresponding to a given compression algorithm or a given implementation of a compression algorithm. In one implementation, each compression algorithm sub-module has associated with it a set of functions to handle initialization, compression, de-compression, backup (optional) and close. Suitable compression algorithms include LZ77, LZ78, Lempel-Ziv-Welch (LZW), deflate (zlib), and CNA algorithms. In one implementation, compression module 98 maintains a compression algorithm table listing the details of each supported compression algorithm. In one implementation, the compression algorithm table is indexed by an algorithm's compression type or some other unique identifier. A given compression algorithm can be applied to traffic corresponding to different network applications or other traffic classes by changing the configuration of the corresponding traffic class object maintained by traffic classification engine to identify the desired compression algorithm as the active compression algorithm As discussed above, a compression algorithm is the particular method used to reduce the size of transferred traffic. Most compression algorithms involve spotting repeated sequences in the data and storing these sequences for quick look-up searches later. A compression dictionary is a location where an algorithm stores its data sequences, predictions, shortened substitutions, and/or any other data it needs to do its job. A compression dictionary is a compilation of common patterns of characters and the shorter strings with which they are replaced when the data is sent across a network. Associated with each compression dictionary is a compression algorithm, such as Lempel-Ziv/Huffman. Compression dictionaries come in different sizes: the smaller dictionaries are faster at compressing data while the larger dictionaries achieve higher compression ratios. However, the difference in compression rates is somewhat minimal. Using a smaller dictionary conserves memory at the expense of compression ratio and that relationship is inversely exponential. In one implementation, compression module 98 may maintain separate dictionaries for each tunnel partner it discovers in the case of dynamic compression dictionaries. Network traffic must be decompressed with the same dictionary with which it was compressed. Accordingly, before compressing, compression module 98 may check with its partner to make sure that the correct dictionary is available. If that dictionary is not available, it will look for one that they both have and will use that common dictionary to compress the data. In one implementation, dictionary selection is handled during the compression tunnel discovery phase.

In one implementation, device 130 also marks and unmarks a flag to keep track of which compression algorithm is currently being applied to outgoing network traffic—stateful or stateless. Stateful compression, in one implementation, refers to a compression algorithm (such as a dynamic codebook compression algorithm) where the codebook used to compress the data flows is dynamically updated as packets are compressed. On the receiving (de-compressing) end, the codebook is also dynamically generated as packets are decompressed. In other words, the codebook is continually updated based on data across multiple packets. Accordingly, a reliable transport layer protocol is desirable in connection with stateful compression algorithms, as it provides for reliable delivery and re-assembles a packet stream in the order it was transmitted and compressed. Stateless compression refers to compression algorithms where there is no relevant state information from packet to packet. For example, compression algorithms using static code books are stateless as no state information corresponding to a previous packet or packets is required to de-compress a subsequent packet. In addition, compression algorithms including dynamic codebooks can also be employed in a stateless mode by re-initializing the codebook to a default codebook with the start of each new packet being compressed and de-compressed. Accordingly, since stateless compression algorithms do not require that all transmitted packets are received and do not require processing of packets in the order of transmission, an unreliable transport layer protocol can be used. Switching between the two modes (stateful and stateless) depends on network conditions and will be discussed in more detail in the next sections.

Figure 3:
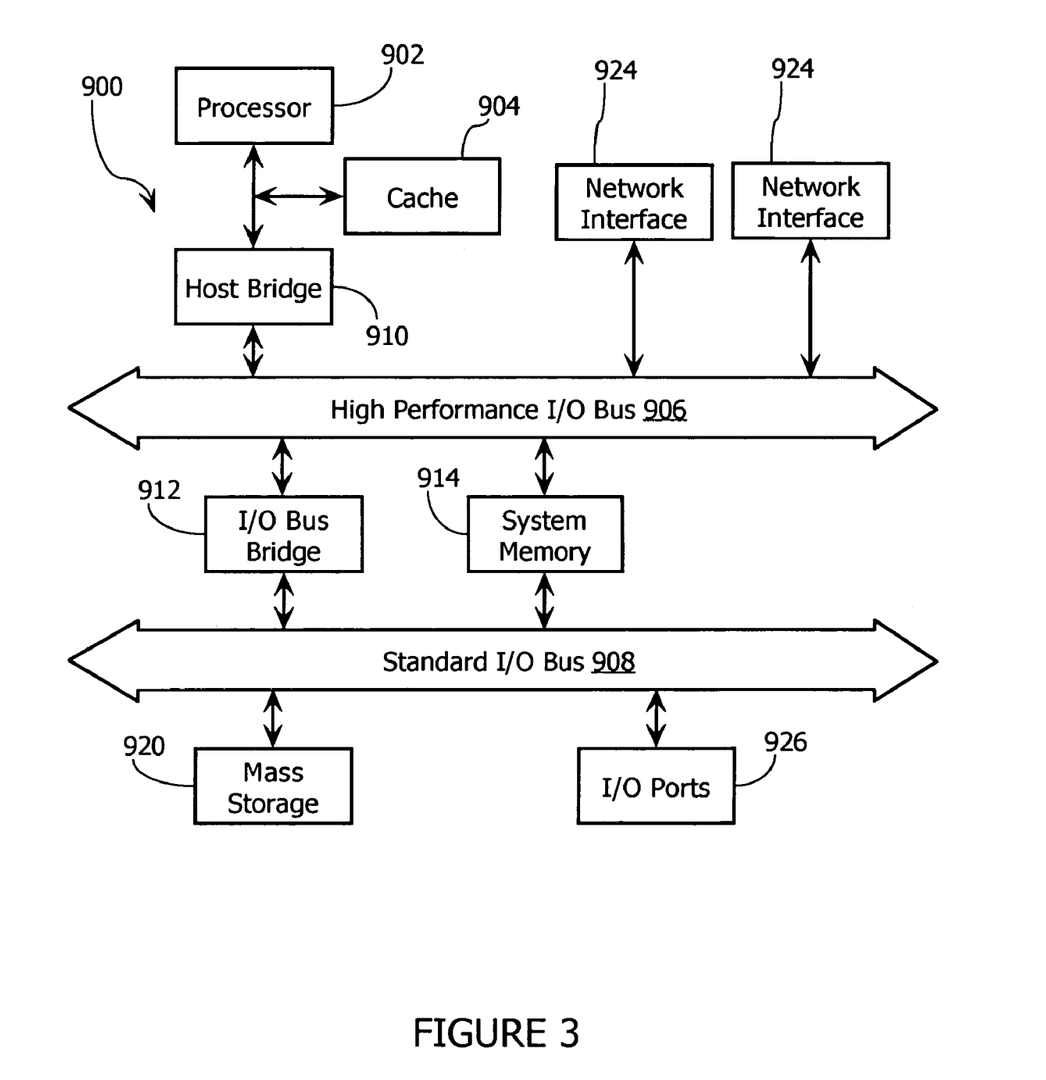
FIG. 3 is a functional block diagram illustrating the hardware components of the data compression device of FIG. 2, in accordance with an exemplary embodiment.

FIG. 3 illustrates for didactic purposes an exemplary computing platform, and hardware architecture, for data compression devices 130*a* and 130*b*. In one implementation, data compression devices 130*a* and 130*b* comprise a system 900 including a processor 902, a system memory 914, network interfaces 924 and one or more software applications and drivers enabling the functions described herein.

The claimed embodiments can be implemented on a wide variety of computer system architectures. For example, FIG. 3 illustrates a hardware system having components suitable for data compression devices 130*a* and 130*b* in accordance with one implementation of the claimed embodiments. In the illustrated embodiment, the hardware system 900 includes processor 902 and a cache memory 904 coupled to each other as shown. Additionally, the hardware system 900 includes a high performance input/output (I/O) bus 906 and a standard I/O bus 908. Host bridge 910 couples processor 902 to high performance I/O bus 906, whereas I/O bus bridge 912 couples the two buses 906 and 908 to each other. Coupled to bus 906 are network/communication interfaces 924, and system memory 914. The hardware system may further include video memory (not shown) and a display device coupled to the video memory. Coupled to bus 908 are mass storage 920 and I/O ports 926. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of computer hardware system 900 perform their conventional functions known in the art. In particular, network interfaces 924 are used to provide communication between system 900 and any of a wide range of networks, such as an Ethernet (e.g., IEEE 802.3) network, etc. Mass storage 920 is used to provide permanent storage for the data and programming instructions to perform the above described functions implemented in the system controller, whereas system memory 914 (e.g., DRAM) is used to provide temporary storage for the data and programming instructions when executed by processor 902. I/O ports 926 are one or more serial and/or parallel communication ports used to provide communication between additional peripheral devices, which may be coupled to hardware system 900.

Hardware system 900 may include a variety of system architectures, and various components of hardware system 900 may be rearranged. For example, cache 904 may be on-chip with processor 902. Alternatively, cache 904 and processor 902 may be packed together as a "processor module," with processor 902 being referred to as the "processor core." Furthermore, certain implementations of the claimed embodiments may not require nor include all of the above components. For example, the peripheral devices shown coupled to standard I/O bus 908 may be coupled to high performance I/O bus 906. In addition, in some implementations only a single bus may exist with the components of hardware system 900 being coupled to the single bus. Furthermore, additional components may be included in system 900, such as additional processors, storage devices, or memories.

As discussed above, in one embodiment, the operations of data compression device 130 described herein are implemented as a series of software routines run by hardware system 900. These software routines comprise a plurality or series of instructions to be executed by a processor in a hardware system, such as processor 902. Initially, the series of instructions are stored on a storage device, such as mass storage 920. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interfaces 924. The instructions are copied from the storage device, such as mass storage 920, into memory 914 and then accessed and executed by processor 902. Other implementations are possible. For example, some or all of the functionality described herein can be embodied in firmware or hardware components, such as application specific integrated circuits, and the like.

An operating system manages and controls the operation of system 900, including the input and output of data to and from software applications (not shown). The operating system provides an interface between the software applications being executed on the system and the hardware components of the system. According to one embodiment of the claimed embodiments, the operating system is the LINUX operating system. However, the claimed embodiments may be used with other conventional operating systems, such as the Windows® 95/98/NT/XP operating system, available from Microsoft Corporation of Redmond, Wash. Apple Macintosh Operating System, available from Apple Computer Inc. of Cupertino, Calif., UNIX operating systems, and the like. Of course, other implementations are possible. For example, the functionality of data compression device 130 may be implemented by a plurality of server blades communicating over a backplane in a parallel, distributed processing architecture.

A.2. Slow-Start Mechanism and Sliding Window

In one implementation, the TCP transport layer protocol is used in connection with stateful compression algorithms, given that it provides for a reliable datagram delivery protocol that re-orders packets at the receiving host. The TCP/IP protocol includes various mechanisms for flow control of network data transfers. Two of these mechanisms are the so-called slow-start mechanism and sliding window mechanism.

The slow-start mechanism is used in conjunction with other algorithms, such as the sliding window, to avoid sending more data than the network is capable of transmitting. The slow-start mechanism works by increasing the TCP congestion window size until acknowledgements are not received for some segments. TCP assumes this loss is due to network congestion, and takes steps to reduce the load on the network. A slow-start algorithm consists of two distinct phases: the exponential growth phase, and the linear growth phase. The algorithm begins in the exponential growth phase initially with 1 or 2 segments (depending on the variant), and increases the congestion window size ("cwnd") exponentially (cwnd=cwnd*2) until a predefined slow-start threshold is reached. Once the threshold is reached, the congestion window size is increased linearly (cwnd=cwnd+1). When segment acknowledgements are not received, the slow-start threshold is set to half of the current congestion window size, and the algorithm restarts. There is also a variation to the slow-start algorithm known as fast recovery. In the fast recovery algorithm, when packets (detected through 3 duplicate ACKS) are not received the congestion window size is reduced to the slow-start threshold, rather than the smaller initial value.

Sliding window is a variable-duration window that allows a sender to transmit a specified number of data units before an acknowledgement is received or before a specified event occurs. An example of a sliding window in packet transmission is one in which, after the sender fails to receive an acknowledgement for the first transmitted packet, the sender "slides" the window, i.e. resets the window, and sends a second packet. This process is repeated for the specified number of times before the sender interrupts transmission.

For example, supposing a fixed window size of "m" packets, a sender may send out packets [n . . . (n+m−1)] before receiving any acknowledgement. If acknowledgement arrives from the receiver for packet "n," then the range (window) of unacknowledged packets slides to [(n+1) . . . (n+m)], and the sender is able to send out packet (n+m). In some way, "sliding" signifies a first-in, first-out ("FIFO") operation, trimming the range at one end, extending it at the other end.

TCP also features an advertised window size. Specifically, a receiving TCP host, when sending an ACK back to the TCP sending host, also indicates to the sender the number of bytes it can receive beyond the last received TCP segment, without causing overrun and overflow in its internal buffers. This is sent in the ACK in the form of the highest sequence number it can receive without problems. The TCP sending host never sends more unacknowledged data than the minimum of the congestion window (cwnd) and the TCP receiver's advertised window.

B. Adaptive Tunnel Transport Protocol

Now that an exemplary framework for practicing the claimed embodiments has been described, those claimed embodiments will now be discussed. As previously indicated, the claimed embodiments contemplate maintaining optimal compression modes in view of current network conditions. When a network is operating optimally, a reliable/stateful compression algorithm is used in conjunction with a reliable transport layer protocol. When network conditions aren't as optimal, a stateless compression mode is utilized in conjunction with an unreliable transport protocol. As a result, the benefits of compression are still maintained during sub-optimal or adverse network conditions.

As alluded to above, one mode is a reliable compression/tunneling mode and it uses a stateful compression algorithm in combination with reliable transport layer protocol and provides for delivery of compressed that is in order and not corrupted. The second mode is an unreliable compression/tunneling mode and it uses a stateless (packet to packet) compression algorithm and unreliable transport layer protocol which does not guarantee delivery of compressed data in a correct order. Data compressed and delivered using the stateless compression mode will typically be sent out over a simple datagram transport protocol that does not require any retransmission of lost or corrupted packets or require a need to re-order packets received by the recipient that are out of order. Typically, the reliable compression/tunneling mode is utilized when network traffic is flowing smoothly and unreliable compression/tunneling mode is utilized when one or more adverse network conditions arise. It should also be noted that a specific dynamic codebook compression algorithm can be used to compress data in either a stateless or stateful manner. This is accomplished by not preserving the state between packets when operating in a stateless mode. Some example compression algorithms include run-length encoding ("RLE"), Huffman encoding, Lempel-ziv compression (e.g., LZ77, LZ78, etc.), Lempel-Ziv-Welch ("LZW") compression, fixed library compression, and combinations/variants of the foregoing compression methods. Additionally, a custom compression algorithm could be employed.

Figure 4:
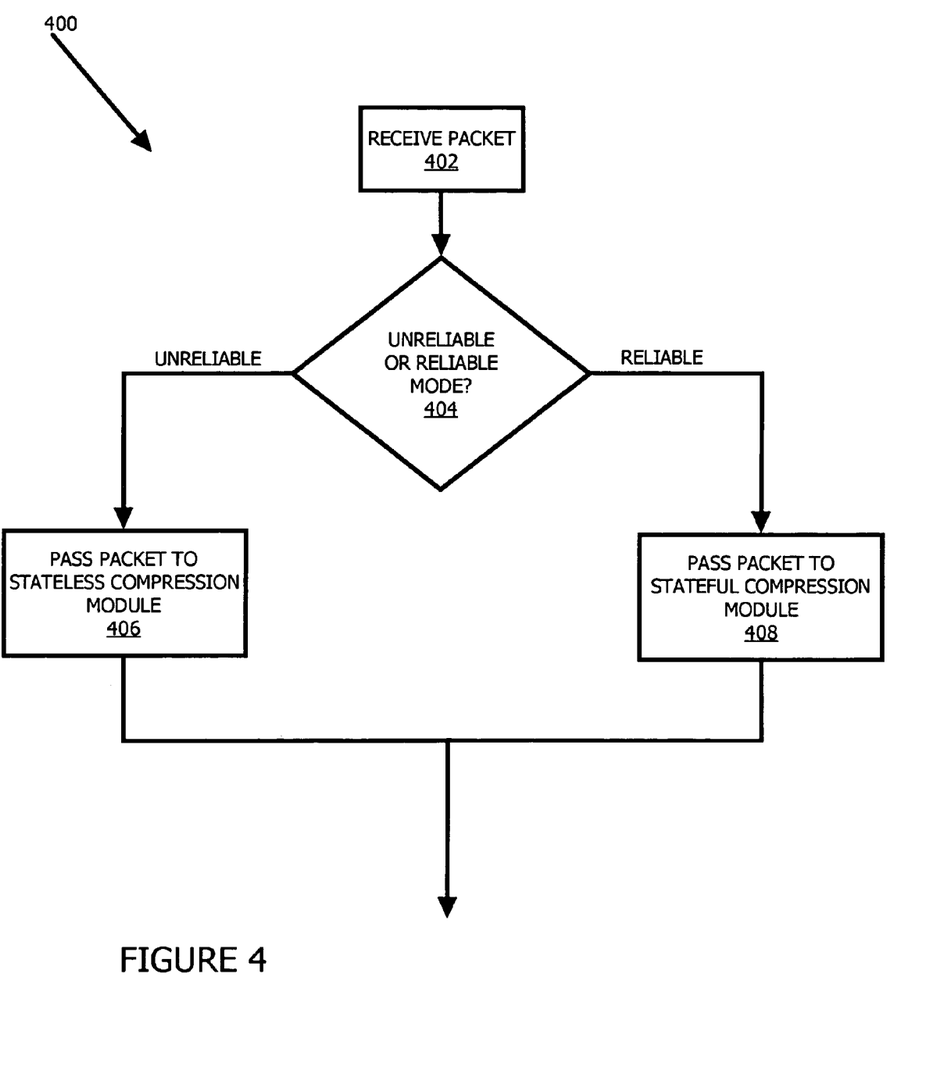
FIG. 4 is a flow chart diagram illustrating a method for processing packets using stateless or stateful compression, in accordance with an exemplary embodiment.

FIG. 4 is a flow chart diagram illustrating a method 400 for processing packets using stateless or stateful compression, in accordance with an exemplary embodiment. Stated succinctly, when compression module 98 receives a packet, it determines the current compression mode (reliable or unreliable), and then passes the packet to a compression sub-module based on the current mode. Tunneling module 94 receives the compressed data and encapsulates the compressed data for transmission to a tunnel partner. In one implementation, tunneling module 94 is operative to switch between the reliable and unreliable compression/tunneling modes based on one or more detected network conditions. In one implementation, tunneling module 94 detects network conditions based on feedback from the TCP protocol module in the network protocol stack, as discussed more fully below.

Initially, compression module 98 receives a packet (402) and determines the current compression mode (404). In one implementation, the compression mode can be indicated by a flag or bit, the value of which indicates either the reliable or unreliable compression/tunneling mode. Of course, other data structures, such as Booleans, variables, and the like can also be used. In one implementation, a flag can be marked when the compression mode transitions from stateful to stateless and unmarked when device 130 goes back to the stateful mode. If device 130 is currently in the unreliable/stateless mode, device 130 passes the packet to a stateless compression module (406). Otherwise, device 130 passes the packet to a stateful compression module (408) as device 130 is in the reliable/stateful mode. The stateful and stateless compression modules, in one implementation, are sub-modules of compression module 98.

As discussed above, tunneling module 94 handles delivery of compressed data to remote tunnel partners. In the reliable/stateful compression mode, tunneling module 94 utilizes a reliable transport layer-protocol (e.g., TCP, XTP and SCPS) implemented by a reliable transport layer module to transmit compressed data. In one implementation, tunneling module 94 switches between the reliable and unreliable compression/tunneling modes (e.g., setting the mode flag, above) based on feedback from the reliable transport layer module. For example, in implementations using TCP as the reliable transport layer protocol, tunneling module 94 writes data received from compression module 98 to a TCP socket corresponding to a given tunnel partner. When in the reliable compression/tunneling mode, tunneling module 94 writes the data to the TCP socket using the non-blocking mode. In the non-blocking mode, the TCP module returns an error if the data written to the TCP socket can not be sent. Otherwise, the TCP module transmits the data. As discussed below, tunneling module 94 uses this error signal as a proxy for adverse network conditions and, thus, switches to the unreliable compression/tunneling mode.

Figure 5:
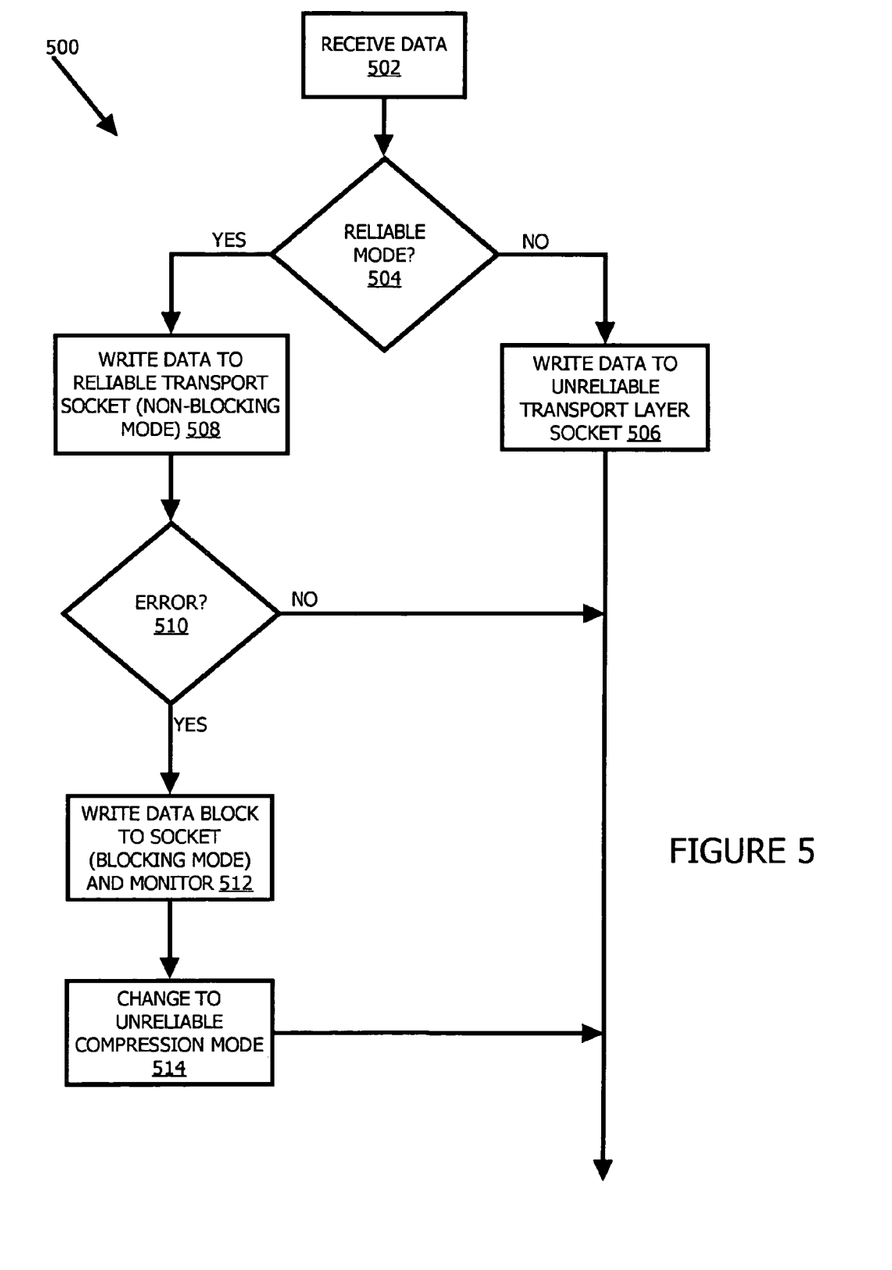
FIG. 5 is a flow chart diagram illustrating a method for writing out compressed blocks of data.

FIG. 5 is a flow chart diagram illustrating a method 500 implemented by tunneling module 94 for writing out compressed blocks of data to a select transport layer module, in accordance with an exemplary embodiment. Briefly summarized, tunneling module 94 receives data from compression module 98 and determines the current mode. If device 130 is in the reliable/stateful mode, tunneling module 94 writes the data to a reliable transport layer socket using a non-blocking mode. If no transmission errors are received from the reliable transport layer module, data will continue to be compressed and transmitted in the reliable mode. An error may occur in the delivery of the data if the current send window for the socket closes off thus preventing the data from being sent right away. If the error does occur, the same data block is written to the transport layer socket using a blocking mode, and monitored for data delivery completion. Data written using a blocking mode will merely wait in an output queue if the data can't be delivered right away and no errors will occur due to the data not being able to be delivered right away. Due to the data delivery error, device 130 signals compression module 98 to switch to the unreliable compression mode by setting the mode flag above. If device 130 was already in the unreliable mode when the packet was received, tunneling module 94 writes data to the transport layer socket using a blocking mode.

Firstly, tunneling module 130 receives a packet (502) and device 130 determines if it is in the reliable mode (504). If no, device 130 is in the unreliable mode and tunneling module 94 writes data out to the blocked data socket (506). Otherwise, tunneling module writes a data block to the reliable transport layer socket (508). If no data transmission error occurs (510), device 130 will remain in the reliable mode. If there is a data transmission error, tunneling module 514 writes the same data block to the transport layer socket using a blocking mode and device 130 monitors for completion of data transmission (512) and signals the compression module 98 to switch to unreliable compression mode (514) by setting the mode flag.

Figure 6:
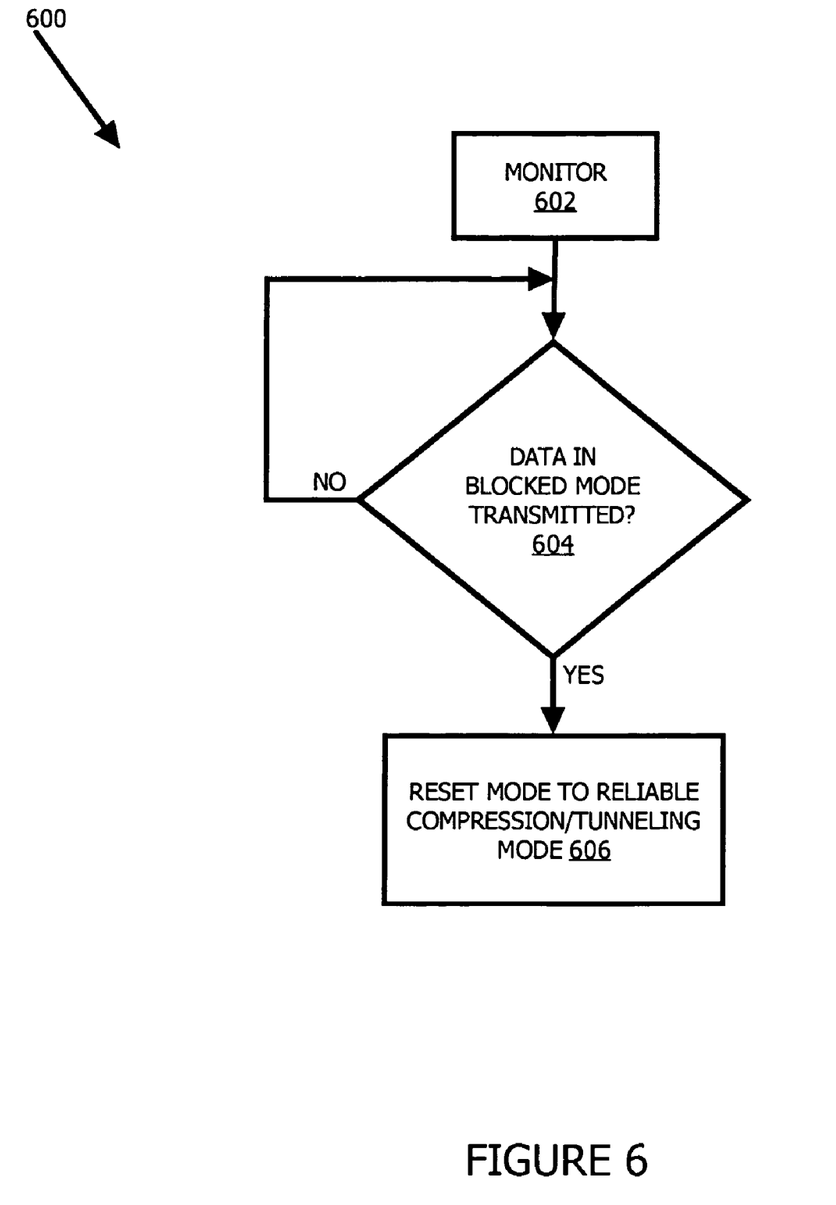
FIG. 6 is a flow chart diagram illustrating a method for determining when to switch back to a reliable compression/tunneling mode, in accordance with an exemplary embodiment.

When device 130 switches to the unreliable mode due to a data transmission error of the reliable/non-blocked data, device 130 will eventually signal the compression module 98 to switch back to the reliable mode when the data block, that had the data transmission error, has been successfully delivered. Successful delivery of the data block indicates that network conditions have improved. FIG. 6 is a flow chart diagram illustrating a method 600 for making the above-described determination to go back to the reliable mode. Device 130 monitors (602) for data delivery completion. When the data block is fully transmitted (604), tunneling module 94 signals the compression module 98 to switch back to the reliable mode (604). The tunneling module 94 is alerted to the data delivery completion via a "callback" from the transport layer. Restated, a previously supplied function is called by the transport layer to notify the tunneling module 94 of the data transmission completion.

A tunneling partner, such as device 130b of FIG. 1, that receives data flows from a remote tunnel partner can identify the tunneling mode in a variety of manners. For example, the transport layer header type (e.g., TCP v. UDP) reveals whether the packet was transmitted using a reliable or unreliable transport protocol. By association, the transport layer protocol indicates whether a stateless or stateful compression algorithm was used to compressed the data. For example, the tunneling partner can ascertain that a packet was compressed using a stateful compression algorithm if it was transmitted via a reliable protocol such as TCP. In a similar manner, the tunneling partner can also discover that a packet was compressed using a stateless compression algorithm if it was transmitted via an unreliable protocol such as UDP. Yet another mechanism for the transmitting tunneling partner to ascertain a packet's compression state is to explicitly set a field or flag in a reserved field of the packet header.

In certain situations, the transmit queue of the reliable transport layer module or socket may be filled up with packets waiting to be transmitted when device 130 switches to the unreliable mode. As a result, the data written to the reliable transport layer module using the blocking mode may arrive after data that has been compressed using a stateless compression algorithm and transmitted using an unreliable transport layer protocol. It is advantageous to minimize out of order packets since packets received out of order, at a recipient, results in the recipient believing that data has been lost. That in turn causes the recipient to send negative acknowledgements "NACKs") to the sender which adds more traffic to a network thus further exacerbating unfavorable network conditions.

To attempt to prevent this from occurring, one possible implementation includes a reliable transport layer module that returns an error, in response to data written to a socket, when adverse network conditions are likely to occur. For example, in implementations employing TCP, the TCP protocol module can be modified to return an error before the send or transmit window is actually exceeded. For example, the TCP module can be modified to return an error when the send window is less than or equal to a threshold value. The threshold value computation includes the amount of data that was most recently written to the socket. For example, if the current send window size less the amount of the data written to the socket is less than the threshold value, then an error is returned, causing tunneling module 94 to switch to the stateless/unreliable compression mode. This mechanism signals a likely network congestion situation before it actually occurs. By doing so, there will generally be a sufficient send window to transmit the data written to the reliable transport module in the blocking mode such that it will be received before or sufficiently near in time to subsequent data compressed and sent in the unreliable compression and tunneling mode.

In an alternate implementation, the logic directed to determining whether a sufficient send window exists can be augmented to first determine whether the TCP connection with the remote tunneling partner is in the slow start phase. If so, an implementation can be configured to either omit the threshold value from the computation to determine whether a sufficient send window exists. Additionally, the threshold can be adjusted during the slow start phase, and/or to return an error (if insufficient send window exists) to the tunneling module 94 with an indication that the TCP connection to the remote tunnel partner is in the slow start phase. In some implementations this allows tunneling module 94 to apply another factor in determining whether to switch to the unreliable mode during a slow start phase.

In addition, switching between the unreliable and reliable compression/tunneling modes can be based on other mechanisms. For the send window size of a given TCP socket, a TCP stack of device 130 can be modified to include a state machine that monitors this parameter relative to a threshold condition. When the send window size falls below a threshold (either because of dropped packets or ACKs or a reduction in the advertised window size), tunneling module 94 will signal the compression module 98 to switch from the reliable mode to the unreliable mode.

Some parameters that device 130 can monitor include a send window size of device 130, a number of requests for re-transmission of lost data during a time period and a number of negative acknowledgements ("NACKs") during a time period. The claimed embodiments are not limited to the preceding list and other parameters can potentially be utilized as an indication of a potential network bandwidth issue and therefore switch to the unreliable mode. These parameters provide an indirect way of monitoring for a data recipient not being able to keep up with the amount of data being sent or that the recipient may be experiencing other issues that is preventing it from efficiently processing received data.

Yet another mechanism that can be utilized to notify a sender of adverse network conditions is explicit signaling between the sender and a recipient. For example, the recipient could signal that packets are being lost, causing the sender to switch to unreliable mode. Also, the recipient can signal that it is not capable of processing the data fast enough which can be used to have the sender decrease the transmission rate of outgoing packets.

The above-described embodiments advantageously provide various methods, systems and apparatuses for maintaining the benefits of compression even during times of adverse network conditions. Even though a less efficient compression algorithm (stateless) is used, it is still more beneficial than no compression at all. As a result, optimal compression is maintained in view of current network conditions.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. In a data compression device operable to establish tunnels with remote tunnel partners and further operable to compress data flows, to the remote tunnel partners, utilizing stateless and stateful compression algorithms, a method for providing optimal compression in view of network conditions, the method comprising:

in a first compression and tunneling mode for transmitting data over a computer network:
compressing data flows using the stateless compression algorithm; and
tunneling the data flows compressed using the stateless compression algorithm to a remote tunnel partner over an unreliable datagram transport protocol;
in a second compression and tunneling mode for transmitting data over the computer network:
compressing data flows using the stateful compression algorithm; and
tunneling the data flows compressed using the stateful compression algorithm to a remote tunnel partner over a reliable transport protocol; and
switching between the first and second compression and tunneling modes based on one or more network conditions.

2. The method as recited in claim 1 wherein the one or more network conditions comprises an indication of network loss.

3. The method as recited in claim 2 wherein the indication of network loss is determined via a send window size that falls below a threshold.

4. The method as recited in claim 2 wherein the indication of network loss comprises a threshold number of data re-transmission requests received during a time period.

5. The method as recited in claim 2 wherein the indication of network loss comprises a threshold number of NACKs received during a time period.

6. The method as recited in claim 3 further comprising: when the data compression device is in the second mode, switching from the second mode to the first mode when the send window size falls below the threshold.

7. The method as recited in claim 6 further comprising switching back to the second mode when the send window size goes above the threshold.

8. The method as recited in claim 1 wherein the data flows are written to a TCP socket using a non-blocking mode after being compressed during the second mode.

9. The method as recited in claim 8 wherein the method further comprises:
when the data compression device is in the second mode:
detecting the one of the one or more network conditions;
writing the data flows to the TCP socket using a blocking mode;
switching to the first mode;
monitoring for completion of a transmission of the data flows written to the TCP socket using the non-blocking mode; and
switching to the second mode when the transmission of the data flows has completed.

10. A data compression device operable to establish tunnels with other remote tunnel partners, operable to compress data flows, to the remote tunnel partners, utilizing stateless and stateful compression algorithms and further operable to provide optimal compression in view of network conditions, the data compression device comprising:
one or more network interfaces;
a memory;
one or more processors; and
computer program code, physically stored in the memory, comprising instructions operable to cause the one or more processors and the data compression device to:
in a first compression and tunneling mode for transmitting data over a computer network:
compress data flows using the stateless compression algorithm; and
tunnel the data flows compressed using the stateless compression algorithm to a remote tunnel partner over an unreliable datagram transport protocol;
in a second compression and tunneling mode for transmitting data over the computer network:
compress data flows using the stateful compression algorithm; and
tunnel the data flows compressed using the stateful compression algorithm to a remote tunnel partner over a reliable transport protocol; and
switch between the first and second compression and tunneling modes based on one or more network conditions.

11. The data compression device as recited in claim 10 wherein the one or more network conditions comprises an indication of network loss.

12. The data compression device as recited in claim 11 wherein the indication of network loss is determined via a send window size that falls below a threshold.

13. The data compression device as recited in claim 11 wherein the one or more network conditions comprises a threshold number of data re-transmission requests received during a time period.

14. The data compression device as recited in claim 11 wherein the one or more network conditions comprises a threshold number of NACKs received during a time period.

15. The data compression device as recited in claim 12 wherein the computer program code further comprises instructions operable to cause the one or more processors and the data compression device to switch from the second mode to the first mode when the send window size falls below the threshold.

16. The data compression device as recited in claim 15 wherein the computer program code further comprises instructions operable to cause the one or more processors and the data compression device to switch to the second mode when the send window size goes above the threshold.

17. The data compression device as recited in claim 10 wherein the data flows are written to a TCP socket using a non-blocking mode after being compressed during the second mode.

18. The data compression device as recited in claim 17 wherein the application further comprises instructions operable to cause the one or more processors and the data compression device to:
when the data compression device is in the second mode:
detect the one of the one or more network conditions;
write the data flows to the TCP socket using a blocking mode;
switch to the first mode;
monitor for completion of a transmission of the data flows written to the TCP socket using the blocking mode; and
switch to the second mode when the transmission of the data flows has completed.

* * * * *